(12) United States Patent
Bajpai et al.

(10) Patent No.: US 9,495,057 B1
(45) Date of Patent: Nov. 15, 2016

(54) SYSTEMS AND METHODS FOR ACCESSING MULTIPLE DATA-PROTECTION APPLICATIONS FROM A SINGLE INTERFACE

(75) Inventors: Vishal Bajpai, Maharashtra (IN); Ajit Hanumant Kirkole, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 1297 days.

(21) Appl. No.: 12/701,413

(22) Filed: Feb. 5, 2010

(51) Int. Cl.
*G06F 3/048* (2013.01)

(52) U.S. Cl.
CPC .................................... *G06F 3/048* (2013.01)

(58) Field of Classification Search
USPC ............ 713/188, 191; 715/738, 736; 726/24
See application file for complete search history.

(56) References Cited

U.S. PATENT DOCUMENTS

| | | | |
|---|---|---|---|
| 5,796,393 A * | 8/1998 | MacNaughton .... | G06F 17/3089 707/E17.116 |
| 6,789,201 B2 * | 9/2004 | Barton et al. .................... | 726/24 |
| 2007/0174664 A1 * | 7/2007 | Carmitchel et al. .............. | 714/5 |
| 2008/0162337 A1 * | 7/2008 | Greenland et al. ............. | 705/38 |

OTHER PUBLICATIONS

Commvault Systems, Inc.; CommVault Search Web Interface 7.0 for Users, Singular Search of Files and e-Mail Managed by CommVault Unified Data Management Software; http://www.sansystems.com.au/docs/DS_SRCH_WebInterface.pdf, as accessed on Nov. 10, 2009.
University of Minnesota; Data Management—Office of Information Technology; http://www.oit.umm.edu/storage/; Taken from site Nov. 17, 2009.
Novosoft Software Development Services; Novosoft News; http://www.novosoft-us.com/other/news.shtml; Taken from site Nov. 17, 2009.
Sciforma; Innovative Project and Portfolio Management Software for the Web; http://www.sciforma.com/en-us/page?id=295; Taken from site Nov. 17, 2009.
"CommVault", http://www.commvault.com/, as accessed Nov. 10, 2009, (Dec. 2, 1998).
"RecoverPoint", http://www.emc.com/storage/recoverpoint/recoverpoint.htm, as accessed Nov. 10, 2009, EMC Corporation, (on or before Nov. 10, 2009).

* cited by examiner

*Primary Examiner* — Matthew Ell
(74) *Attorney, Agent, or Firm* — ALG Intellectual Property, LLC

(57) ABSTRACT

A computer-implemented method for accessing multiple data-protection applications from a single interface. The method may include providing, in a portion of a web browser, a graphical toolbar interface for interfacing with a plurality of data-protection applications. The graphical toolbar interface may comprise at least one user input region for receiving input from a user and at least one data-display region for displaying representations of data received from the plurality of data-protection applications. The method may also include receiving, at the user input region, a request directed to at least one data-protection application of the plurality of data-protection applications and sending the request to the at least one data-protection application.

19 Claims, 7 Drawing Sheets

SYSTEMS AND METHODS FOR ACCESSING MULTIPLE DATA-PROTECTION APPLICATIONS FROM A SINGLE INTERFACE

BACKGROUND

Many data-protection products are currently available to provide a variety of data-protection services to consumers and organizations. Often, users will utilize multiple data-protection products to meet their needs. For example, an organization may use one software package to perform data-backup operations and another software package to perform data-archiving operations. Users, such as enterprise administrators, often manage data-protection services for an enterprise environment using an Internet-based interface. The administrators may log into different product web portals to monitor different data-protection products operating within the enterprise environment or to perform frequent data-protection tasks and operations.

While enterprise administrators may be able to remotely access data-protection products through a web-based interface, the administrators may waste a significant amount of time switching between multiple web pages or windows in order to accomplish frequent data-protection activities. Administrators may also be required to perform many other web-based tasks in addition to the data-protection activities, thereby reducing their overall efficiency in accomplishing the tasks. Accordingly, the instant disclosure identifies and addresses a need for systems and methods that provide a single, convenient access point for frequent data-protection tasks and operations.

SUMMARY

As will be described in greater detail below, the instant disclosure generally relates to systems and methods for accessing multiple data-protection applications from a single interface. According to certain embodiments, a computer-implemented method for accessing multiple data-protection applications from a single interface may include providing, in a portion of a web browser, a graphical toolbar interface for interfacing with a plurality of data-protection applications. The graphical toolbar interface may comprise at least one user-input region for receiving input from a user and at least one data-display region for displaying representations of data received from the plurality of data-protection applications. The method may also include receiving, at the user-input region, a request directed to at least one data-protection application of the plurality of data-protection applications and sending the request to the at least one data-protection application. The method may further include receiving data from the at least one data-protection application and displaying a representation of the data in the data-display region.

In at least one embodiment, receiving the request directed to the at least one data-protection application comprises receiving at least one of a search query, a request for the at least one data-protection application to perform at least one operation, and a request to modify at least one setting of the at least one data-protection application. In some embodiments, receiving the request directed to the at least one data-protection application may comprise receiving a search query directed to the plurality of data-protection applications, sending the search query to the plurality of data-protection applications, and receiving search results from at least one data-protection application of the plurality of data-protection applications. In various embodiments, the plurality of data-protection applications may comprise at least one of, a data-backup application, a data-recovery application, a data-archiving application, a data-deduplication application, a data-snapshot application, and a continuous data-protection application.

According to certain embodiments, the data-display region of the graphical toolbar interface may further comprise a monitoring subregion for displaying at least one monitored characteristic of the plurality of data-protection applications. The method may further comprise sending a request for data concerning the at least one monitored characteristic to at least one data-protection application of the plurality of data-protection applications and receiving updated data concerning the at least one monitored characteristic from the at least one data-protection application. In some embodiments, the monitoring subregion may comprise a ticker for displaying the at least one monitored characteristic as updates of the at least one monitored characteristic received from the plurality of data-protection applications.

According to at least one embodiment, the user-input region may comprise at least one application access subregion for accessing at least one data-protection application of the plurality of data-protection applications. The at least one application access subregion may comprise a link for opening the at least one data-protection application and an application portal associated with the at least one data-protection application. The method may further comprise receiving a request to access the at least one data-protection application and opening the data-protection application in a portion of the web browser that is separate from the graphical toolbar interface. According to various embodiments, the method may further comprise receiving a request to modify at least one setting of the graphical toolbar interface and modifying the at least one setting of the graphical toolbar interface. The at least one setting of the graphical toolbar may comprise at least one of a graphical-display setting, a user-access setting, a user-input setting, a search setting, an application-monitoring setting, a task-management setting, a scheduling setting, and a user log-on setting.

According to certain embodiments, a computer-implemented method for interfacing with multiple data-protection applications from a single location may comprise providing, in a portion of a web browser, a graphical toolbar interface for interfacing with a plurality of data-protection applications. The graphical toolbar interface may comprise at least one user-input region for receiving input from a user and at least one display region for displaying data received from the plurality of data-protection applications. The method may also comprise receiving a search query directed to the plurality of data-protection applications, sending the search query to the plurality of data-protection applications, and receiving search results from at least one data-protection application of the plurality of data-protection applications. Receiving search results from the at least one data-protection application may comprise receiving search results from two or more of the data-protection applications of the plurality of data-protection applications. The method may further comprise displaying a representation of the search results as a single set in the data-display region.

According to some embodiments, a system for accessing multiple applications from a single interface may comprise an interface module programmed to display a graphical toolbar interface for interfacing with a plurality of data-protection applications. The graphical toolbar interface may comprise at least one user-input region for receiving input from a user and at least one data-display region for displaying representations of data received from the plurality of data-protection applications. The system may also comprise a user input module programmed to receive, at the user-input region, a request directed to at least one data-protection application of the plurality of data-protection applications and a communication module programmed to send the request to the at least one data-protection application. In some embodiments, the system may comprise a monitoring module for monitoring at least one characteristic of the plurality of data-protection applications. In various embodiments, the user input module may be programmed to receive a request to modify at least one setting of the graphical toolbar interface and modify the at least one setting of the graphical toolbar interface.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
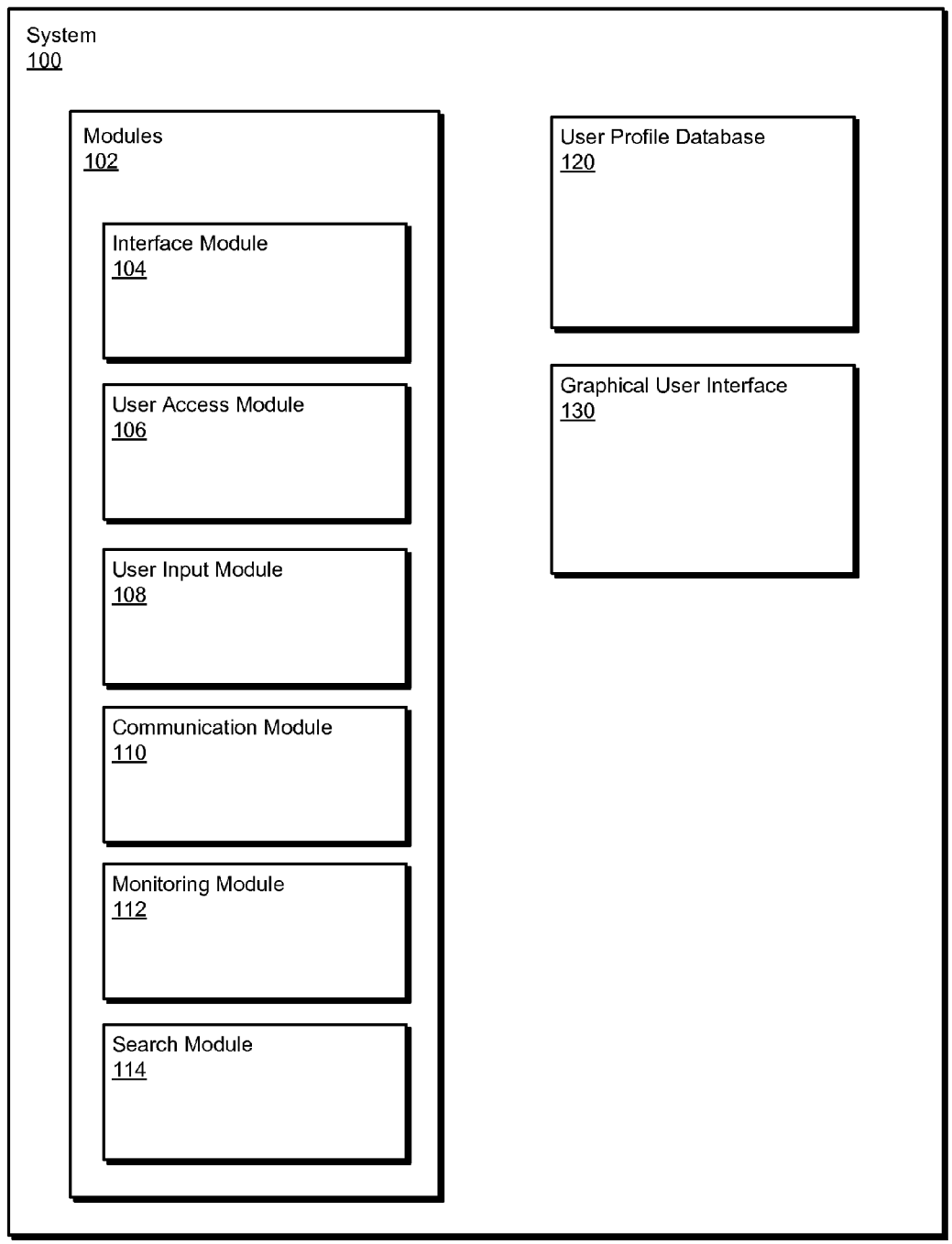
FIG. 1 is a block diagram of an exemplary system for accessing multiple data-protection applications from a single interface.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for accessing multiple data-protection applications from a single interface. Embodiments of the instant disclosure may provide systems and methods for accessing multiple data-protection applications from a graphical toolbar interface. The graphical toolbar interface may provide an administrator or other user with access to frequent data-protection tasks and operations related to the multiple data-protection applications. The graphical toolbar interface may also enable an administrator to monitor characteristics of the multiple data-protection applications. The graphical toolbar interface may additionally reduce the amount of time devoted to rendering data received from data-protection applications.

The graphical toolbar interface may be located within a web browser and may occupy only a portion of a graphical display, enabling the user to perform various other activities, including web-based activities not related to data-protection, without closing the graphical toolbar interface. Accordingly, the graphical toolbar interface may enable an administrator to more efficiently and effectively perform numerous data-protection activities from a single access location. Additionally, because the graphical toolbar interface may take up a minimal amount of screen space, the graphical toolbar interface may be used on devices having small displays, such as portable electronic devices.

The phrase "data-protection application," as used herein, generally refers to software programs having a primary functionality related to protecting data in a computer system and/or networked environment. Examples of data-protection applications may include, without limitation, data-backup applications, data-recovery applications, data-archiving applications, data-deduplication applications, data-snapshot applications, and/or continuous data-protection applications.

Figure 2:
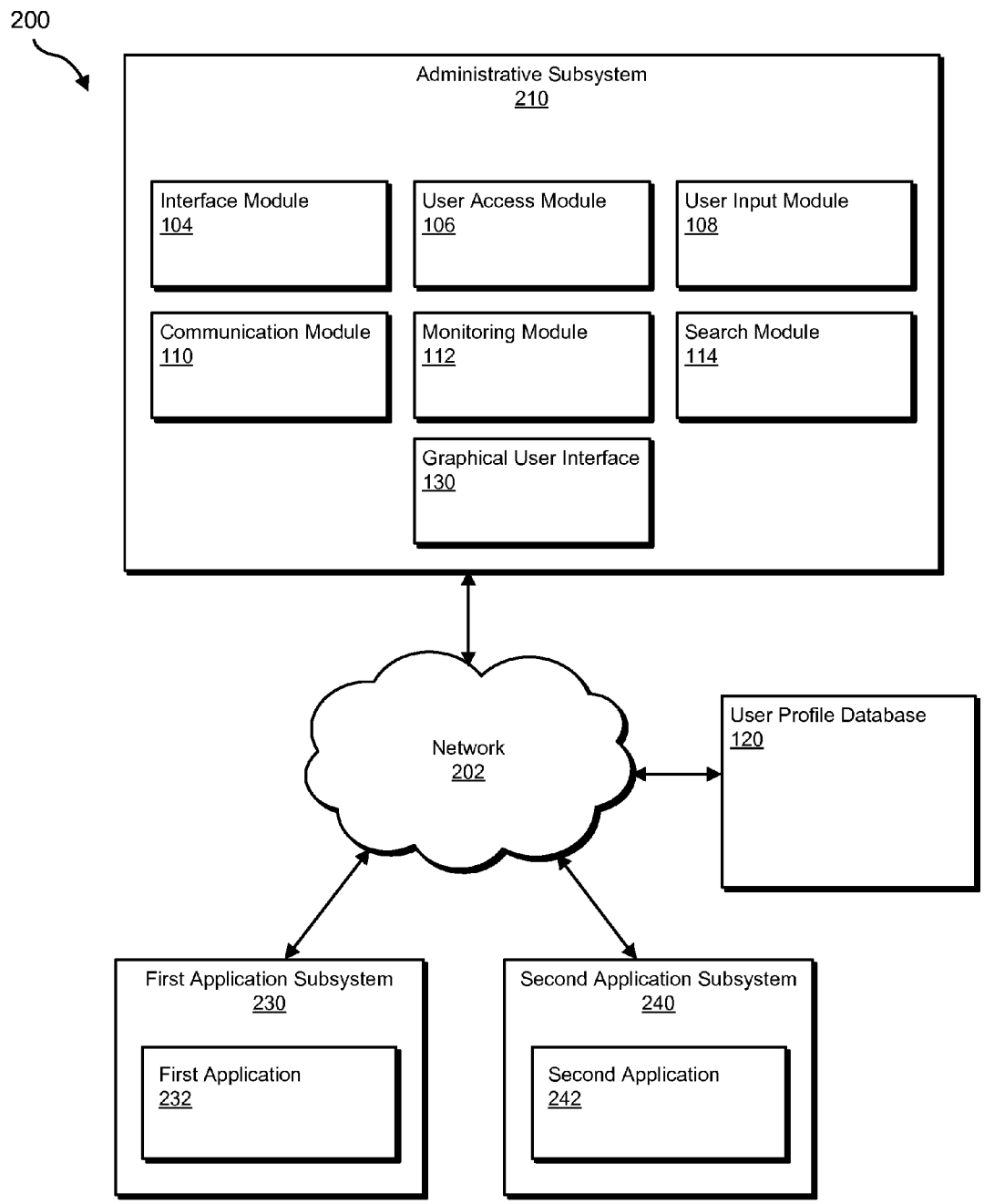
FIG. 2 is a block diagram of another exemplary system for accessing multiple data-protection applications from a single interface.

The following will provide, with reference to FIGS. 1-2, detailed descriptions of exemplary systems for accessing multiple data-protection applications from a single interface. A detailed description of an exemplary graphical user interface that includes a toolbar interface for accessing multiple data-protection applications from a single interface will be provided in connection with FIG. 3. Detailed descriptions of corresponding computer-implemented methods will also be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for accessing multiple data-protection applications from a single interface. As illustrated in this figure, exemplary system 100 may include one or more modules 102 for performing one or more tasks. For example, and as will be explained in greater detail below, exemplary system 100 may include an interface module 104 programmed to display a graphical toolbar interface for interfacing with a plurality of data-protection applications. Exemplary system 100 may also include a user access module 106 programmed to enable a user to access and/or modify data-protection applications based on a user profile for the user.

In addition, and as will be described in greater detail below, exemplary system 100 may include a user input module 108 programmed to receive requests directed to data-protection applications. Exemplary system 100 may also include a communication module 110 programmed to send user requests to data-protection applications and receive data from data-protection applications. Exemplary system 100 may further include a monitoring module 112 programmed to monitor selected characteristics of data-protection applications. Exemplary system 100 may also include a search module 114 programmed to send search queries to data-protection applications and receive search results from the data-protection applications. In some examples, monitoring module 112 and/or search module 114 may communicate with various applications and subsystems via communication module 110. Although illustrated as separate elements, one or more of modules 102 in FIG. 1 may represent portions of a single module or application. Exemplary system 100 may additionally include a graphical user interface 130 that is shown to a user on a display, such as a monitor or portable electronic device display. Interface module 104 may be programmed to display images in graphical user interface 130 as will be described in greater detail below.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as administrative subsystem 210, first application subsystem 230, and/or second application subsystem 240 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include a user profile database 120 for storing user profile information for one or more users of system 100. User profile database 120 may represent a portion of a single database or computing device or a plurality of databases or computing devices. User profile information may include information concerning a user's role and/or responsibility within an enterprise environment. For example, the user's role and/or responsibility may correlate to the user's hierarchical position within an organization and/or the user's administrative duties within the organization. User profile information may also include toolbar settings and/or preferences specific to a particular user. For example, a user may select certain display and/or functionality settings for a graphical toolbar interface. In an additional example, a user may select certain preferences defining how information is displayed in a display region of a graphical toolbar interface.

User profile database 120 in FIG. 1 may represent a portion of one or more computing devices. For example, user profile database 120 may represent a portion of a computing device, such as administrative subsystem 210, first application subsystem 230, and/or second application subsystem 240 in FIG. 2, computing system 610 in FIG. 6, and/or portions of exemplary network architecture 700 in FIG. 7. User profile database 120 in FIG. 1 may also represent all or portions of one or more special-purpose computers configured to perform one or more tasks. Alternatively, user profile database 120 may represent one or more physically separate devices capable of being accessed by a computing device, such as administrative subsystem 210, first application subsystem 230, and/or second application subsystem 240 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include an administrative subsystem 210 in communication with user profile database 120, first application subsystem 230, and second application subsystem 240 via network 202. Administrative subsystem 210, user profile database 120, first application subsystem 230, and second application subsystem 240 generally represent any type or form of computing device capable of reading computer-executable instructions. System 200 may also include additional subsystems, without limitation. Examples of administrative subsystem 210, user profile database 120, first application subsystem 230, and second application subsystem 240 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Administrative subsystem 210 may be accessed by a user, such as an administrator, having authorization to access applications on first application subsystem 230 and/or second application subsystem 240. Administrative subsystem 210 may include interface module 104, user access module 106, user input module 108, communication module 110, monitoring module 112, search module 114, and graphical user interface 130. While FIG. 2 shows modules 104-114 on a single computing subsystem, the functionality of one or more of modules 104-114 may be located on a computing system remote from administrative subsystem 210 (e.g., in a cloud-computing environment).

First application subsystem 230 may include a first application 232 and second application subsystem 240 may include a second application 242. First application 232 and/or second application 242 may each include a data-protection application such as a data-backup application, a data-recovery application, a data-archiving application, a data-deduplication application, a data-snapshot application, and/or a continuous data-protection application. First application subsystem 230 and/or second application subsystem 240 may be located on the same computing device or on separate computing devices. In some embodiments, user profile database 120, first application subsystem 230, and/or second application subsystem 240 may be located on the same computing device as administrative subsystem 210.

Figure 3:
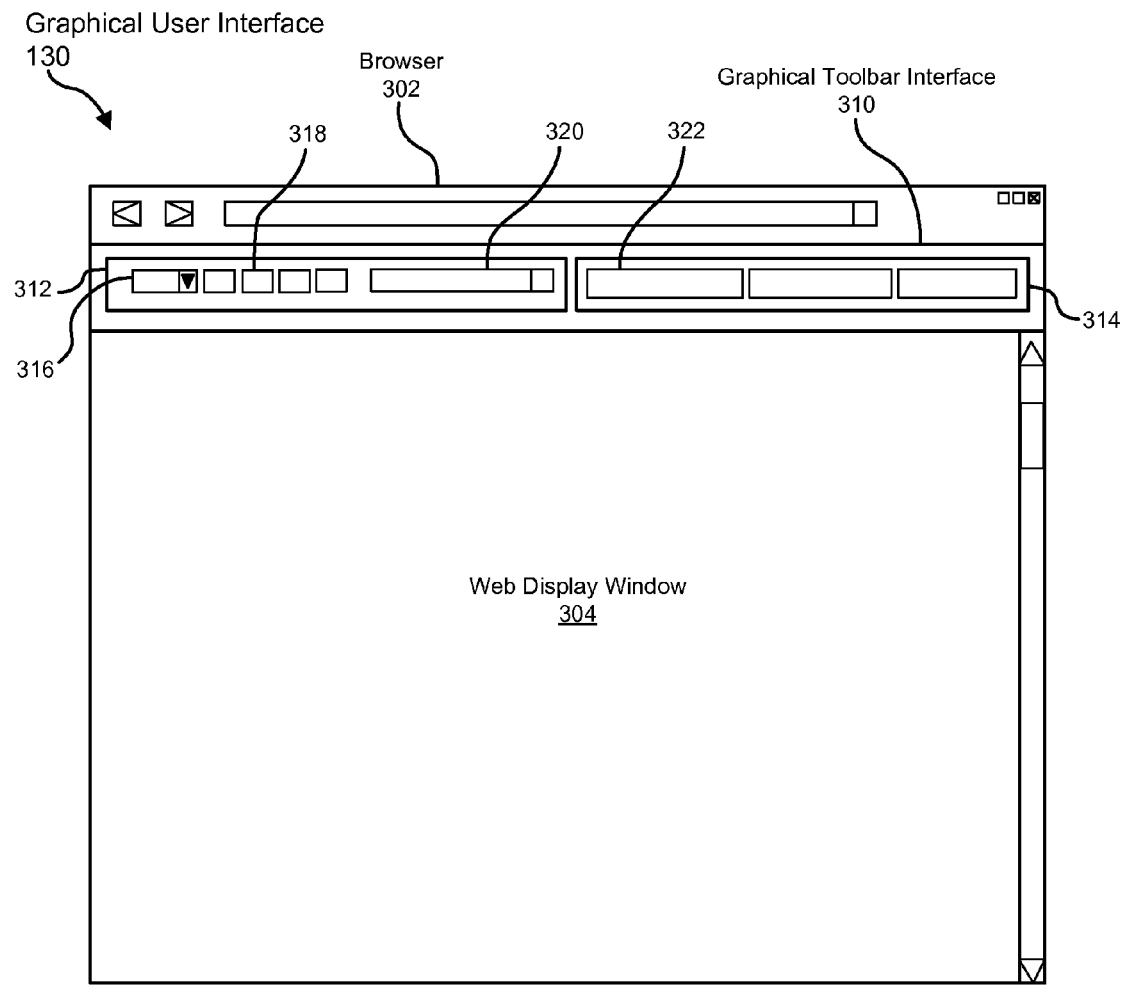
FIG. 3 is an illustration of a graphical user interface for accessing multiple data-protection applications.

FIG. 3 is an illustration of a graphical user interface 130 that includes a graphical toolbar interface 310 used for accessing multiple data-protection applications. FIG. 3 shows graphical user interface 130 as it may appear to a user. As shown, graphical user interface 130 may include a web browser 302 having a web display window 304. Web browser 302 may include any browser suitable for navigating web pages on the Internet, including, without limitation, a WINDOWS INTERNET EXPLORER, MOZILLA FIREFOX, GOOGLE CHROME, or APPLE SAFARI browser.

FIG. 3 illustrates graphical toolbar interface 310 positioned near a top portion of web browser 302. However, graphical toolbar interface 310 may be positioned at any suitable region of web browser 302. In some examples, graphical toolbar interface 310 may be positioned by a user at any suitable location within graphical user interface 130. Graphical toolbar interface 310 may take up only a portion of web browser 302, enabling a user to view content in graphical toolbar interface 310 and web display window 304 simultaneously. Accordingly, a user may view and/or modify content in both graphical toolbar interface 310 and web display window 304 without navigating to another web page or display window. For example, web browser 302 may be opened in a single browser window, and a user may access all of the content displayed by web browser 302, including graphical toolbar interface 310 and web display window 304. In other embodiments, graphical toolbar interface 310 may take up all of a web browser display window. Graphical toolbar interface 310 may communicate with applications, such as data-protection applications, via communication module 110.

As shown in FIG. 3, graphical toolbar interface 310 may include a user-input region 312 and a data-display region 314. User-input region 312 may receive various types of input from a user and may include one or more subregions for receiving at least one type of input from the user. User-input region 312 may communicate with one or more applications and/or may act as a link to the one or more applications via communication module 110. For example, a user may enter input into user-input region 312, and communication module 110 may send a request, command, and/or query to at least one application in response to the user input. In another example, a user may enter input into user-input region 312, and interface module 104 may open an application and/or web page associated with an application in a portion of web browser 302, such as web display window 304.

As illustrated in FIG. 3, user-input region 312 may comprise subregions for entering various types of user input. The subregions in user-input region 312 may include, without limitation, a drop-down menu 316, a button 318, and/or a text field 320 for receiving user input. In some examples, a user may select drop-down menu 316. Drop-down menu 316 may display one or more selection choices that are available to the user. For example, drop-down menu 316 may display a list of data-protection applications that the user may access or a list of regular activities performed by the user. Button 318 may comprise a graphic, such as an icon, or text that the user may select. A user may select button 318 to perform a specified action. For example, a user may select button 318 to perform a data-backup operation using a data-backup application. In some embodiments, a user may enter text into text field 320. For example, a user may enter a search term into text field 320, directing the computing system to search for the search term within multiple data-protection applications.

Interface module 104 may display representations of data to a user in data-display region 314. For example, data-display region 314 may include representations of data received from one or more data-protection applications. Data-display region 314 may be divided into a plurality of data-display subregions 322 for displaying various types of data. For example, a user may enter a request for a status update regarding a data-protection application into user-input region 312. Communication module 110 may send the request to at least one data-protection application and may receive a status update from the at least one data-protection application. Interface module 104 may then display the status update in at least one of the data-display subregions 322 in data-display region 314. In at least one example, data-display region 314 may include one or more locations for receiving user input. For example, a data item displayed in data-display region 314 may comprise a hyperlink to a data-protection application associated with the item. In an additional example, one or more selection options, such as selection buttons, may be displayed near a data item displayed in data-display region 314.

According to at least one embodiment, graphical toolbar interface 310 may be configured in accordance with user profile information stored in user profile database 120 for a particular user. In some examples, a user profile stored in user profile database 120 may contain information concerning the user's roles and/or responsibilities in an organization and/or an enterprise environment. For example, the user profile may indicate that the user is an administrator in charge of configuring and managing various data-protection services for an enterprise network. Based on the user's role as an administrator, the user may be provided with more access options in graphical toolbar interface 310 than a user who does not have the same administrative role.

In some examples, the user profile may contain preferences and/or options that are defined by a user. For example, the user may define various visual characteristics of graphical toolbar interface 310, such as the layout, size, and/or location of graphical toolbar interface 310. The user may define what selection options are available in graphical toolbar interface 310. The user may further define how data is displayed in graphical toolbar interface 310. For example, the user may define that data-display region 314 displays search results received from a plurality of applications as a single set of search results grouped together in a data-display subregion 322. In some examples, the user may define a filter that only permits data meeting specified criteria to be displayed in data-display region 314.

According to various embodiments, interface module 104 may display task reminders, such as reminders concerning frequently performed tasks, in a portion of data-display region 314. For example, a user may schedule task deadlines and reminders. In an additional example, the system may determine a reminder schedule based on the user's frequency in performing various tasks. In some embodiments, interface module 104 may also display alerts concerning one or more data-protection applications. For example, an alert may be displayed in data-display region 314 if an amount of system memory used by first application 232 and/or second application 242 exceeds a predetermined threshold value.

Figure 4:
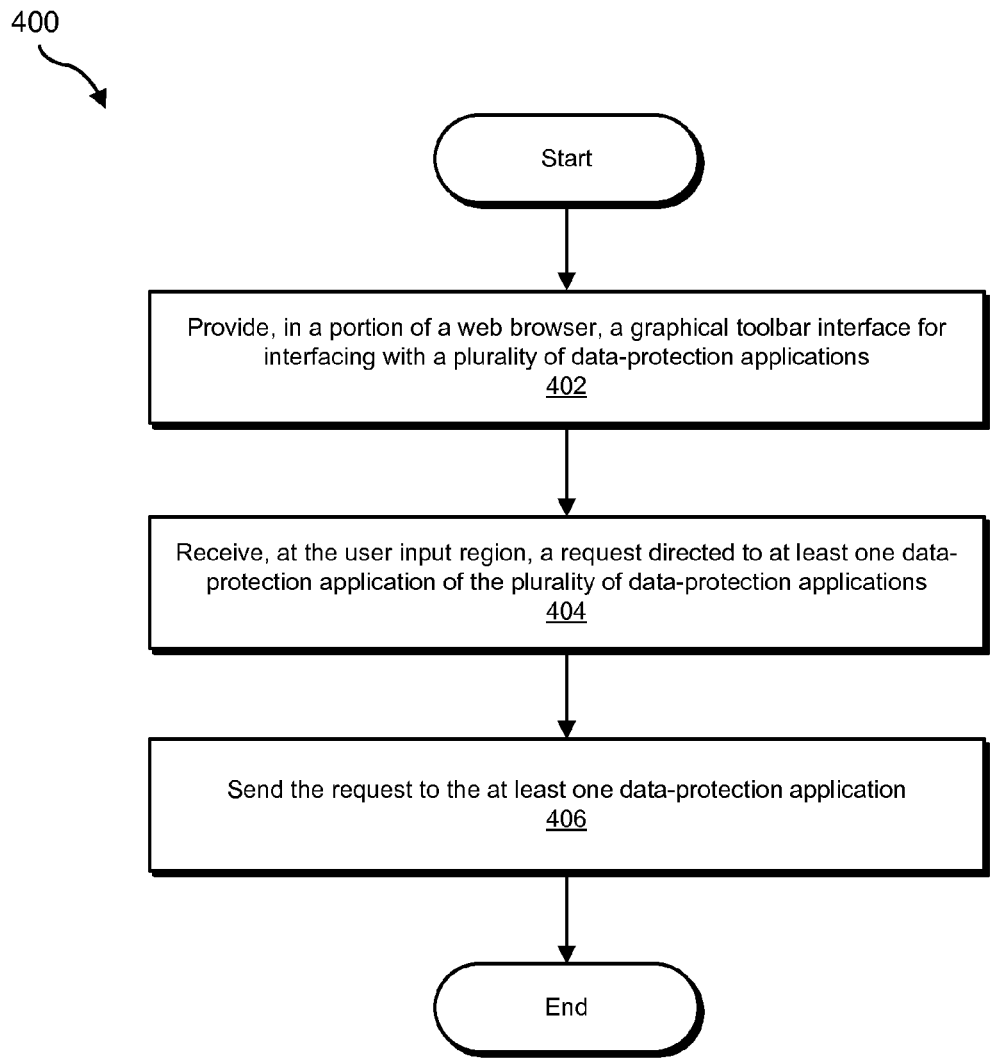
FIG. 4 is a flow diagram of an exemplary method for accessing multiple data-protection applications from a single interface.

FIG. 4 is a flow diagram of an exemplary computer-implemented method 400 for accessing multiple data-protection applications from a single interface. The steps shown in FIG. 4 may be performed by any suitable computer-executable code and/or computing system. In some embodiments, the steps shown in FIG. 4 may be performed by one or more of the components of system 100 in FIG. 1. At step 402, one or more of the systems described herein may provide, in a portion of a web browser, a graphical toolbar interface for interfacing with a plurality of data-protection applications, such as first application 232 and/or second application 242 in FIG. 2. For example, interface module 104 on administrative subsystem 210 may provide graphical toolbar interface 310 in a portion of web browser 302, as illustrated in FIG. 3.

In some embodiments, prior to allowing a user to access graphical toolbar interface 310, user access module 106 may first require the user to log in with a user name and password. Additionally, user access module 106 may check a user profile for the user based on the user's log in information. For example, user access module 106 may request the user profile from user profile database 120. Access module 106 may allow the user to access graphical toolbar interface 310 based on the user's roles and/or responsibilities with respect to system 300. Additionally, access module 106 may allow the user to access graphical toolbar interface 310, but may limit what toolbar functionality is available to the user based on their roles and/or responsibilities. In some embodiments, the user profile and/or log-on information may be sent to at least one data-protection application to provide the user with access to the at least one data-protection application and/or with access to data sent from the at least one data-protection application.

At step 404 in FIG. 4, one or more of the systems described herein may receive, at the user-input region, a request directed to at least one data-protection application of the plurality of data-protection applications. For example, a user may enter a request in user-input region 312. The request may comprise any suitable request directed to at least one data-protection application. The request may be directed to a specific data-protection application and/or may be directed to each of a plurality of data-protection applications. For example, the request may comprise a search query that is entered into text field 320. The search query may search for a term or a collection of terms, and may utilize various search features, such as search filters and/or Boolean connectors, to define the parameters of the search. The user input may direct search module 114 to search within a single data-protection application or a plurality of data-protection applications.

In various embodiments, a request entered into user input region 312 may comprise a request for the at least one data-protection application to perform at least one operation. For example, the user may make a selection in user-input region 312 directing a data-archiving application to archive data within an enterprise system. In some examples, the request may comprise a request to modify at least one setting of the at least one data-protection application. For example, the user may make a selection in user-input region 312 directing a data-backup application to backup system data on a daily basis instead of on a weekly basis.

A user may also request that at least one setting and/or user preference of graphical toolbar interface 310 be modified. For example, the user may request that a layout and/or position of graphical toolbar interface 310 in web browser 302 be adjusted. The at least one setting of graphical toolbar interface 310 may include, without limitation, a graphical-display setting, a user-access setting, a user-input setting, a search setting, an application-monitoring setting, a task-management setting, a scheduling setting, and/or a user log-on setting.

According to at least one embodiment, the request by the user may comprise a request to access the at least one data-protection application. For example, the user may select an application access subregion in user-input region 312 that links the user to the at least one data-protection application. In some embodiments, the user may request to be linked to the at least one data-protection application through the graphical toolbar interface 310 and/or to be linked to a web page or other interface for the application that is displayed in web display window 304 and/or another region of graphical user interface 130. The requests entered into user-input region 312 may be directed to a single application or to multiple applications.

According to various embodiments, a user may use graphical toolbar interface 310 to monitor the one or more data-protection applications. In at least one example, a user may make a selection in user-input region 312 to direct monitoring module 112 to monitor at least one characteristic of the one or more data-protection applications. For example, the user may request that monitoring module 112 monitor the amount of system memory dedicated to the data-protection applications. In an additional example, the user may request that monitoring module 112 monitor the operating status of the data-protection applications.

At step 406 in FIG. 4, one or more of the systems described herein may send the request entered by the user to the at least one data-protection application. For example, communication module 110 in FIG. 1 may send the request to at least one of first application 232 and/or second application 242 in FIG. 2. Communication module 110, monitoring module 112, and/or search module 114 may, for example, send a search query, a request to perform an action, a modification request, and/or a monitoring request to one or more data-protection applications.

According to at least one embodiment, after a request is sent to one or more data-protection applications, communication module 110 may receive data from at least one of the data-protection applications. For example, after communication module 110 sends a search query to both first application 232 and second application 242 in FIG. 2, one or both of first application 232 and second application 242 may return search result data to search module 114. For example, in response to a query for a particular file name, first application 232 and second application 242 may conduct a search for the file name within system databases, such as data-backup and/or archive databases, specified in the query. After determining the locations of all file names containing the file name term, first application 232 and second application 242 may return data indicating the locations of the files to search module 114.

In various embodiments, in response to a request for at least one data-protection application to perform a particular operation or a request to modify a setting of the at least one data-protection application, the at least one data-protection application may perform the operation or may modify the setting. The at least one data-protection application may then return an indication that the requested action or modification has been performed. For example, in response to a request to update user log-on information on first application 232, first application 232 may update the log-on information and may send an indication that an update of the log-on information is completed to communication module 110. To change user log-on information for a separate application, a user may enter a separate request into user input region 312, and communication module 110 may send the request the separate application.

In some embodiments, a user may enter an individual request into user-input region 312 to modify at least one application setting for a data-protection application. For example, the user may enter a request to modify log-on information for first application 232 into a sub-region of user-input region 312. The user may enter a separate request to modify log-on information for second application 242 into a sub-region of user-input region 312. In certain embodiments, a user may enter a single request into user-input region 312 that is applicable to multiple data-protection applications. For example, the user may enter a request into a sub-region of user-input region 312 to receive email notifications of various task completions from both first application 232 and second application 242. Communication module 110 may then send the request for email notifications to both first application 232 and second application 242. In some embodiments, in response to a request to monitor characteristics of at least one data-protection application, the at least one data-protection application may send data concerning the requested characteristic to monitoring module 112. In some examples, in response to a single monitoring request sent from monitoring module 112, the at least one data-protection application may send multiple periodic updates of data concerning the requested characteristic to monitoring module 112. For example, in response to a single monitoring request, first application 232 may periodically send status updates concerning the amount of available system memory utilized by first application 232.

After communication module 110 receives data from at least one data-protection application, interface module 104 may display a representation of the data in graphical user interface 130. For example, interface module 104 may display a representation of search results in data-display region 314 of graphical toolbar interface 310. A text and/or graphic representing the data received from the at least one data-protection application may be displayed in one or more data-display subregions 322 in data-display region 314. In some examples, the text or graphic may also comprise a link to a data-protection application and/or to a web page or other information source associated with the data-protection application. For example, a user may use a cursor to select a search result received from first application 232. In response, interface module 104 may display additional information concerning the search result and/or first application 232 in data-display region 314 and/or web display window 304. By way of another example, a user may use a cursor to select data concerning a monitored characteristic of first application 232 and/or second application 242. In response, interface module 104 may display a menu comprising a list of selection options available to the user in a portion of graphical toolbar interface 310.

According to at least one embodiment, interface module 104 may display updates in data-display region 314. For example, data-display region 314 may display text and/or graphics representing monitoring data received from at least one data-protection application. Data-display region 314 may include a monitoring subregion for displaying representations of monitoring data received from one or more data-protection applications. In certain examples, data-display region 314 may include a ticker that continuously or periodically changes in response to monitoring updates.

Figure 5:
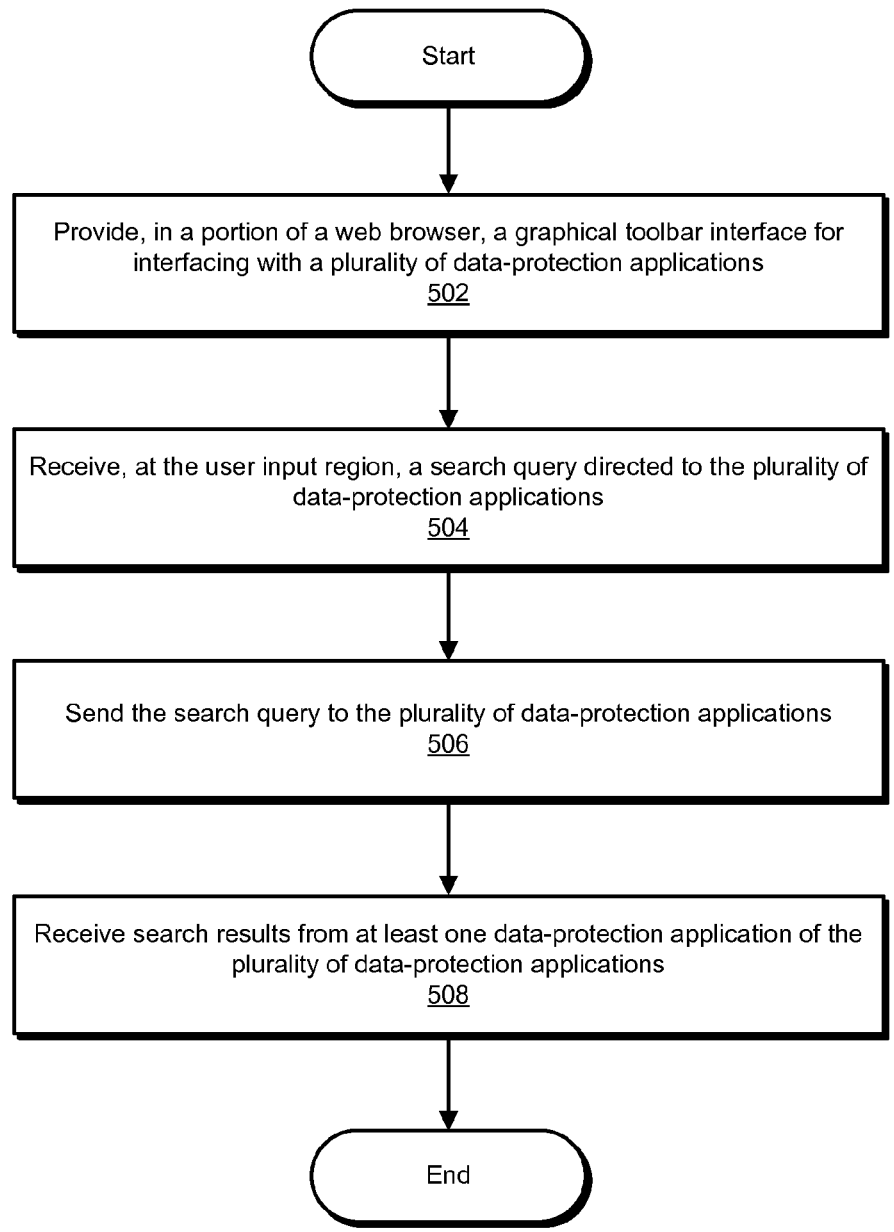
FIG. 5 is a flow diagram of another exemplary method for accessing multiple data-protection applications from a single interface.

FIG. 5 is a flow diagram of an exemplary computer-implemented method 500 for accessing multiple data-protection applications from a single interface. In some embodiments, the steps shown in FIG. 5 may be performed by one or more of the components of system 100 in FIG. 1. At step 502, one or more of the systems described herein may provide, in a portion of a web browser, a graphical toolbar interface for interfacing with a plurality of data-protection applications, such as first application 232 and/or second application 242 in FIG. 2. For example, interface module 104 on administrative subsystem 210 may provide graphical toolbar interface 310 in a portion of web browser 302, as illustrated in FIG. 3.

At step 504 in FIG. 5, one or more of the systems described herein may receive, at the user-input region, a search query directed to the plurality of data-protection applications. The user may define the search parameters to include each of the plurality of data-protection applications, such as first application 232 and second application 242 in FIG. 2. For example, the user may search for the number of instances of a particular file stored within a database managed by a data-backup application and a database managed by a data-archiving application. At step 506 in FIG. 5, one or more of the systems described herein may send the search query to the plurality of data-protection applications. For example, search module 114 in FIG. 1 may send the search query to both first application 232 and second application 242 in FIG. 2.

At step 508 in FIG. 5, one or more of the systems described herein may receive search results from at least one data-protection application of the plurality of data-protection applications. For example, one or both of first application 232 and second application 242 may return identifications of instances of file names containing a specified search term within data-backup databases and/or data-archiving databases managed by first application 232 and/or second application 242. In various embodiments, search module 114 may receive search results from two or more of the data-protection applications of the plurality of data-protection applications. For example, both first application 232 and second application 242 may return search results to search module 114. In at least one example, interface module 104 may display a representation of the search results received from the two or more data-protection applications as a single set in data-display region 314.

Figure 6:
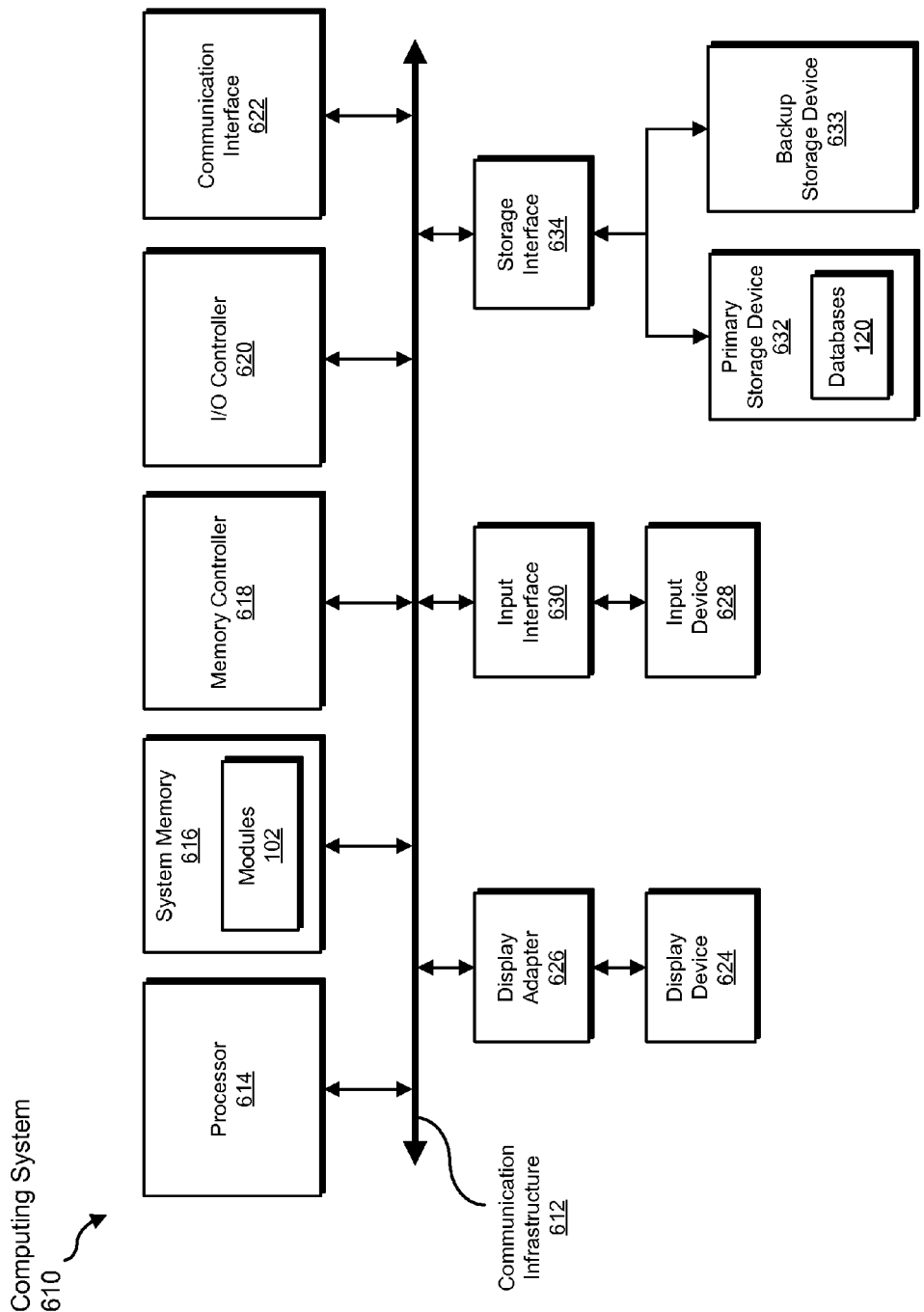
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the providing, receiving, sending, opening, modifying, and displaying steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as providing, receiving, sending, opening, modifying, and displaying.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the providing, receiving, sending, opening, modifying, and displaying steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the providing, receiving, sending, opening, modifying, and displaying steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the providing, receiving, sending, opening, modifying, and displaying steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, user profile database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the providing, receiving, sending, opening, modifying, and displaying steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
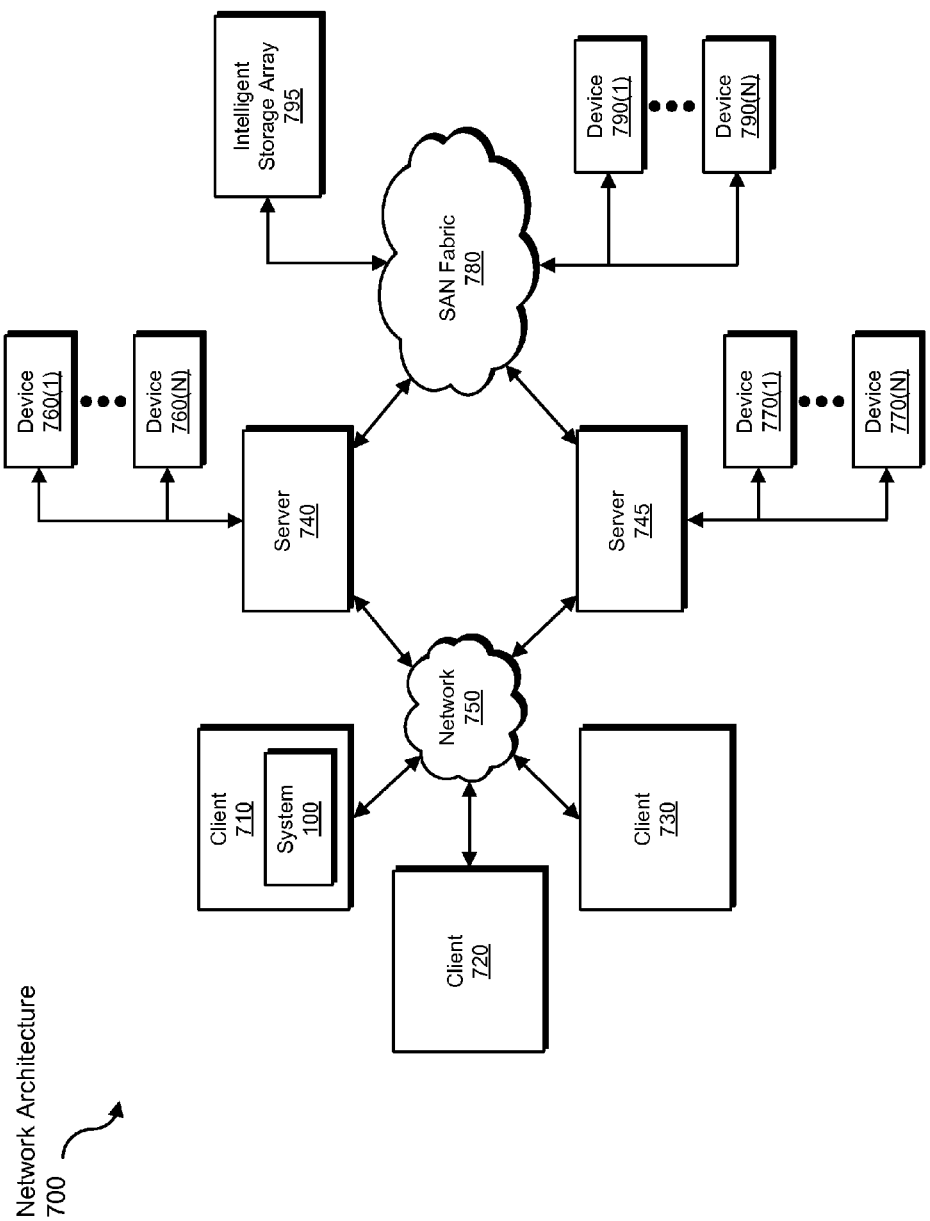
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the providing, receiving, sending, opening, modifying, and displaying steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for accessing multiple data-protection applications from a single interface.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the modules described herein may transform a computing system by changing settings on the computing system to allow multiple data-protection applications to be accessed from a single interface.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for administering multiple data-protection applications from a single interface, at least a portion of the method being performed by a computing device comprising at least one processor, the method comprising:

identifying a first data-protection application that an administrator manages via a first web-based interface by performing a first task on the first web-based interface;

identifying a second data-protection application that the administrator manages via a second web-based interface by performing a second task on the second web-based interface, wherein the first data-protection application and the second data-protection application are separate and distinct applications;

providing, in a portion of a web browser, a graphical toolbar interface to the administrator that enables the administrator to perform the first task and the second task on the graphical toolbar interface rather than on the first web-based interface and the second web-based interface, wherein:

the first web-based interface, the second web-based interface, and the graphical toolbar interface are separate and distinct interfaces;

the graphical toolbar interface comprises:

at least one user-input region for receiving input from the administrator;

at least one data-display region for displaying representations of data received from the first data-protection application and the second data-protection application;

receiving a search query directed to the first data-protection application and the second data-protection application;

sending the search query to the first data-protection application and the second data-protection application;

receiving search results from at least one of the first data-protection application and the second data-protection application.

2. The computer-implemented method of claim 1, further comprising displaying a representation of the search results in the data-display region.

3. The computer-implemented method of claim 1, wherein:

the first task comprises at least one of:

performing a search;

requesting that the first data-protection application perform at least one operation;

requesting to modify at least one setting of the first data-protection application;

the computer-implemented method further comprises receiving at least one of:

an additional search query;

a request for the first data-protection application to perform the at least one operation;

a request to modify the at least one setting of the first data-protection application.

4. The computer-implemented method of claim 1, wherein the first data-protection application comprises at least one of:

a data-backup application;

a data-recovery application;

a data-archiving application;

a data-deduplication application;

a data-snapshot application.

5. The computer-implemented method of claim 1, wherein the data-display region of the graphical toolbar interface further comprises a monitoring subregion for displaying at least one monitored characteristic of the first data-protection application.

6. The computer-implemented method of claim 5, further comprising:
sending a request for data concerning the at least one monitored characteristic to the first data-protection application;
receiving updated data concerning the at least one monitored characteristic from the first data-protection application.

7. The computer-implemented method of claim 5, wherein the monitoring subregion comprises a ticker for displaying the at least one monitored characteristic as updates of the at least one monitored characteristic are received from the first data-protection application.

8. The computer-implemented method of claim 1, wherein the user-input region comprises at least one application access subregion for accessing the first data-protection application, the at least one application access subregion comprising a link for opening at least one of:
the first data-protection application;
the web-based interface of the first data-protection application.

9. The computer-implemented method of claim 1, wherein:
the administrator has responsibilities for managing the first data-protection application and the second data-protection application;
the graphical toolbar interface is provided to the administrator based on the administrator's responsibilities for managing the first data-protection application and the second data-protection application.

10. The computer-implemented method of claim 1, wherein the first data-protection application requires the administrator to log on using log-on information that is separate and distinct from that of the second data-protection application.

11. The computer-implemented method of claim 10, further comprising sending the log-on information required by the first data-protection application to the first data-protection application.

12. The computer-implemented method of claim 1, further comprising:
receiving a request to modify at least one setting of the graphical toolbar interface;
modifying the at least one setting of the graphical toolbar interface, wherein the at least one setting of the graphical toolbar interface comprises at least one of:
a graphical-display setting;
a user-access setting;
a user-input setting;
a search setting;
an application-monitoring setting;
a task-management setting;
a scheduling setting;
a user log-on setting.

13. The computer-implemented method of claim 1, tangibly embodied as computer-executable instructions on at least one computer-readable medium.

14. A computer-implemented method for administering multiple data-protection applications from a single location, at least a portion of the method being performed by a computing device comprising at least one processor, the method comprising:
identifying a first data-protection application that an administrator manages via a first web-based interface by performing a first task on the first web-based interface;
identifying a second data-protection application that the administrator manages via a second web-based interface by performing a second task on the second web-based interface, wherein the first data-protection application and the second data-protection application are separate and distinct applications;
providing, in a portion of a web browser, a graphical toolbar interface to the administrator that enables the administrator to perform the first task and the second task on the graphical toolbar interface rather than on the first web-based interface and the second web-based interface, wherein:
the first web-based interface, the second web-based interface, and the graphical toolbar interface are separate and distinct interfaces;
the graphical toolbar interface comprises:
at least one user-input region for receiving input from the administrator,
at least one data-display region for displaying data received from the first data-protection application and the second data-protection application;
receiving, from the administrator at the user-input region, a search query directed to the first data-protection application and the second data-protection application;
sending the search query to the first data-protection application and the second data-protection application;
receiving search results from the first data-protection application and the second data-protection application.

15. The computer-implemented method of claim 14, further comprising
displaying a representation of the search results as a single set in the data-display region.

16. The computer-implemented method of claim 14, tangibly embodied as computer-executable instructions on at least one computer-readable medium.

17. A system for administering multiple applications from a single interface, the system comprising:
a memory that stores:
an interface module programmed to:
identify a first data-protection application that an administrator manages via a first web-based interface by performing a first task on the first web-based interface;
identify a second data-protection application that the administrator manages via a second web-based interface by performing a second task on the second web-based interface, wherein the first data-protection application and the second data-protection application are separate and distinct applications;
display a graphical toolbar interface to the administrator that enables the administrator to perform the first task and the second task on the graphical toolbar interface rather than on the first web-based interface and the second web-based interface, wherein:
the first web-based interface, the second web-based interface, and the graphical toolbar interface are separate and distinct interfaces;
the graphical toolbar interface comprises:
at least one user-input region for receiving input from the administrator;
at least one data-display region for displaying representations of data received from the first data-protection application and the second data-protection application;

a user input module programmed to receive, from the administrator at the user-input region, a search query directed to the first data-protection application and the second data-protection application;

a communication module programmed to:
send the search query to the first data-protection application and the second data-protection application;
receive search results from at least one of the first data-protection application and the second data-protection application;

at least one physical processor that executes the interface module, the user input module, and the communication module.

18. The system of claim 17, further comprising a monitoring module programmed to monitor at least one characteristic of the first data-protection application.

19. The system of claim 17, wherein the user input module may further be programmed to:
receive a request to modify at least one setting of the graphical toolbar interface;
modify the at least one setting of the graphical toolbar interface.

\* \* \* \* \*